June 14, 1966     E. W. FERDIG     3,255,997
ROLLER ASSEMBLY COMBINATION
Filed April 11, 1963     4 Sheets-Sheet 1
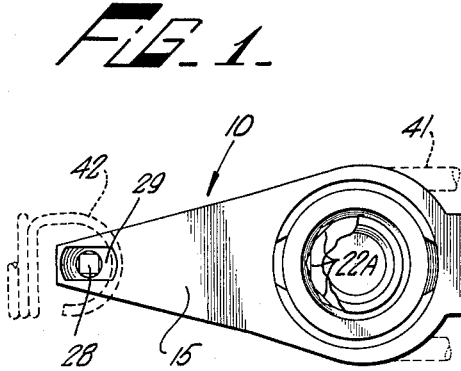
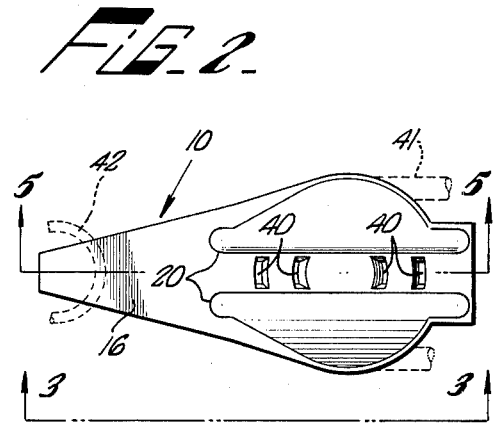
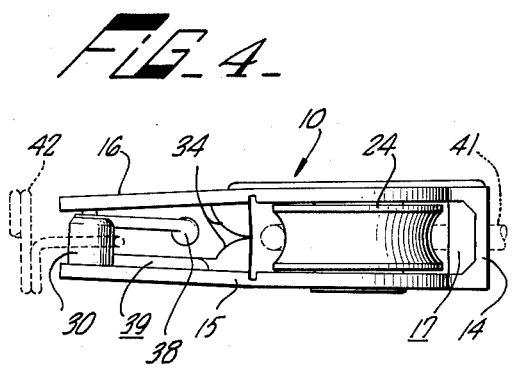
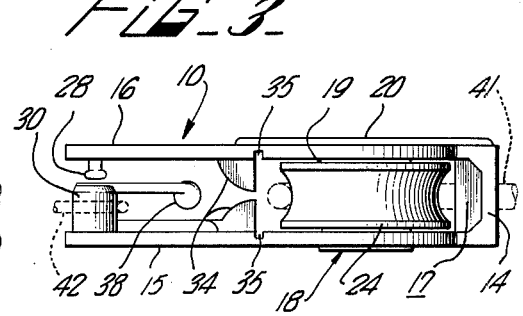
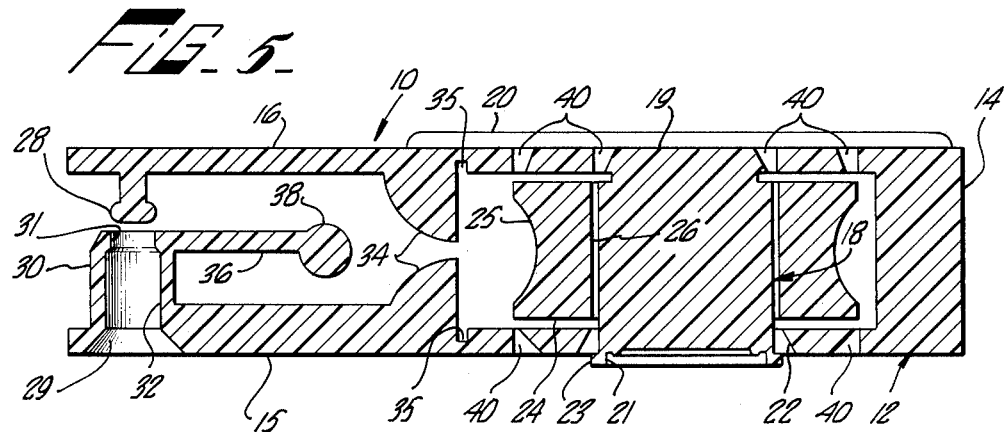
INVENTOR.
EARL W. FERDIG
BY
Christie, Parker & Hale
ATTORNEYS.

June 14, 1966 E. W. FERDIG 3,255,997
ROLLER ASSEMBLY COMBINATION
Filed April 11, 1963 4 Sheets-Sheet 2

INVENTOR.
EARL W. FERDIG
BY
Christie, Parker & Hale
ATTORNEYS.

June 14, 1966  E. W. FERDIG  3,255,997
ROLLER ASSEMBLY COMBINATION
Filed April 11, 1963  4 Sheets-Sheet 3

INVENTOR.
EARL W. FERDIG
BY
Christie, Parker & Hale
ATTORNEYS.

June 14, 1966 E. W. FERDIG 3,255,997
ROLLER ASSEMBLY COMBINATION
Filed April 11, 1963 4 Sheets-Sheet 4

INVENTOR.
EARL W. FERDIG
BY
Christie, Parker & Hale
ATTORNEYS.

United States Patent Office 3,255,997
Patented June 14, 1966

3,255,997
ROLLER ASSEMBLY COMBINATION
Earl W. Ferdig, Burbank, Calif., assignor to
George F. McMurray, Los Angeles, Calif.
Filed Apr. 11, 1963, Ser. No. 272,285
10 Claims. (Cl. 254—192)

This invention relates to roller assemblies.

The invention has many different uses, such as in wheels, bearings, and the like, but it is specifically described with reference to its use as a pulley for drapery cords.

There is a large demand for inexpensive rollers which can be used in a wheel, bearing, pulley, and the like. In the past, such devices have been made by separately molding or otherwise foming rollers, shafts, and mounting fixtures, and then assembling the units into operative positions. The disadvantage of this prior procedure is that the various parts are formed and handled separately, and the assembling step is time-consuming and expensive.

This invention provides a plastic roller or pulley assembly with an integrally formed mounting fixture. The entire array is cast in a simple mold and ejected readily for immediate use, i.e, the roller is cast around the shaft to be rotatable on it, and the mounting fixture is formed integrally with the shaft so the entire assembly is ready for mounting where needed.

The assembly of this invention includes a plastic roller having an axial opening through it. A plastic shaft is disposed in the opening, and a mounting fixture is formed integrally on the shaft. Preferably, the fixture extends transversely to the shaft axis for a distance sufficient to form an effective outer diameter greater than the effective diameter of the roller opening to prevent the roller from slipping longitudinally along the shaft past the fixture. Means are provided for preventing the roller from slipping off the other end of the shaft.

In one form, the mounting fixture is a clamp or bracket formed integrally with the shaft and adjacent one face of the roller. The shaft projects beyond the fixture and is threaded so the fixture can be locked against a curtain rod, or the like. In another fom, the mounting fixture is a U-shaped frame with the roller mounted on the shaft traversing the closed end of the U. Such an arrangement is convenient for mounting cord tension pulleys for drapery pull cords. Preferably, the open end of the U includes closure means for temporarily snapping the U-shaped frame closed so that a pull cord and tension spring can be locked within the frame. Spacers are also provided on the opposed inside faces of the frame to engage each other when the open end of the frame is snapped closed to prevent the sides of the frame from binding against the roller. Proper flexing of the sides of the frames to enhance this result is aided by reducing the thickness of the sides of the frame between the roller and the spacers.

The mold for casting the roller assembly includes a body which defines a mold pocket. A hollow sleeve is secured at one end to the body, and extends into the pocket to define the shaft cavity within the sleeve. An annular wall is disposed in the pocket around it spaced from the sleeve to define a roller cavity between the sleeve and annular wall. The annular wall is also spaced from the body to define a mounting fixture cavity in communication with one end of a shaft cavity.

Preferably, a longitudinally movable ejection pin is mounted within the body to be collinear with the shaft cavity and facilitate ejection of the cast shaft from the mold. Supports are also provided to space the annular wall from the sides of the mold pocket and insure proper formation of the mounting fixture cavity.

These and other aspects of the invention will be more fully understood from the following detailed description and the accompanying drawings, in which:

FIG. 1 is a plan view, partly broken away, of one side of a roller cast integrally within a U-shaped frame in accordance with this invention;

FIG. 2 is a plan view of the opposite side of the pulley shown in FIG. 1;

FIG. 3 is a view taken on line 3—3 of FIG. 2 with the pulley frame in an open position;

FIG. 4 is a side elevation of the pulley with the frame snapped shut;

FIG. 5 is a view taken on line 5—5 of FIG. 2;

Figure 8:
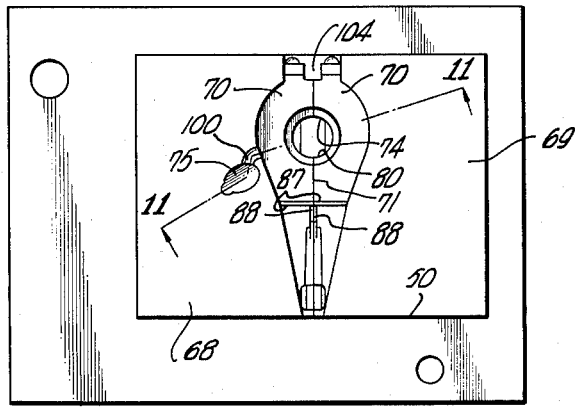
FIG. 8 is a view taken on line 8—8 of FIG. 7, with the first block removed for clarity.
Figure 10:
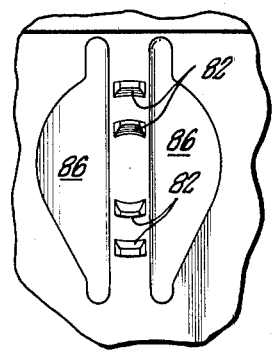
FIG. 10 is a fragmentary view taken on line 10—10 of FIG. 7.
Figure 9:
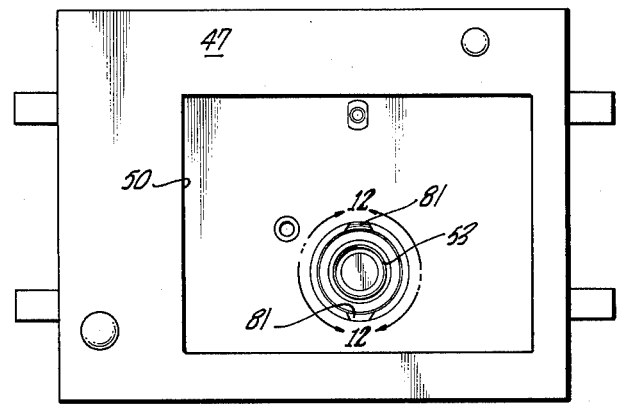
FIG. 9 is a view taken on line 9—9 of FIG. 7.

Referring to FIGS. 1 through 5, one form of the invention is embodied in a pulley assembly 10 which includes a generally U-shaped frame 12 having a bottom 14 and opposed flexible sidewalls 15 and 16 which are each integrally formed at one end with the bottom of the frame, and are normally open at their opposite ends. The frame bottom and closed end of the sidewalls are reinforced by an internal web 17 formed integrally with them.

A traverse shaft 18 has one end 19 formed integrally with the inside face of sidewall 16. The outer surface of this sidewall carries a pair of laterally spaced elongated reinforcing ribs 20 to strengthen the wall.

The opposite end 21 of the shaft extends through an outwardly tapered opening 22 in the sidewall 15. The tapered opening includes six inwardly extending and radially spaced projections 22A around its periphery. The free end 21 of the shaft carries an outwardly extending flange 23 which has an effective outside diameter that is slightly larger than the smallest inside diameter of the tapered opening in the sidewall 15. A roller 24 with a concave periphery 25 and an axial opening 26 through it is disposed within the frame and around the shaft to be rotatable on it. The diameter of the axial opening is slightly less than the outside diameter of the flange on the shaft. Sidewall 15 prevents the roller from sliding off the flanged end of the shaft, but if the opening 22 in sidewall 15 should be forced outwardly over the flange, the roller still will not be free to slide off the shaft.

The free or open end of the sidewall 16 carries an inwardly extending button 28 which is disposed opposite a button recess 29 in an inwardly extending boss 30 on the inside face of the free end of sidewall 15. The button recess has a stepped bore with a first relatively short section 31 near the button 28 and of slightly smaller diameter than the button. The remainder of the button recess bore is an enlarged section 32 which is substantially the same diameter as that of the button. To facilitate casting in the mold and removal from the mold, the button recess 29 extends all the way through the boss. When the two free ends of the sidewalls are squeezed together, the button is forced into the recess to form a snap closure to close the open end of the frame as shown in FIG. 4. A separate inwardly extending spacer 34 is formed integrally on the inner face of each sidewall adjacent the side of the roller toward the snap closure. The inner portions of the spacers engage as shown in FIG. 4 to prevent the sidewalls of the frame from binding against the roller when the frame is closed. The inside face of each sidewall of the frame includes a traverse groove 35 adjacent the inner portion of each spacer to facilitate deflection of the sidewalls around the part of the roller nearest the spacers.

An elongated retaining clip 36 is formed integrally at one end with the raised end of the boss, and extends toward the spacers, but stops short of them. A stop ball 38 is formed integrally on the end of the clip adjacent the spacers. A reinforcing rib 39 on the inner face of sidewall 15 is formed integrally with the wall, boss, and spacer on the wall.

Each sidewall of the frame includes openings 40 through it which were formed by spacers used in the mold to cast the pulley, and are described in detail with reference to FIGS. 7, 9, 10, and 11, below.

The entire pulley assembly is made of suitable plastic, such as nylon, and is cast in the assembled position shown in FIGS. 1, 2, 3 and 5, so that when the unit is removed from the mold, it is ready for use without further assembling.

The pulley assembly shown in FIGS. 1 through 5 can be used for a wide variety of purposes, but it is specially suited to serve as a cord tension pulley for draperies, and its use in that application is as follows:

With the frame open as shown in FIGS. 3 and 5, a drapery pull cord 41 (shown only in phantom line) is slipped into the open end of the frame, past the spacers, and around the roller and closed end of the frame. The loop of a spring 42 (shown only in phantom line) is slipped into the open end of the frame under the retaining clip, and pulled back against the inside surface of the boss. The snap closure is then closed by squeezing the free ends of the sidewalls together so that the button is forced into the button recess as shown in FIG. 4. The unit is now ready for use in a conventional drapery installation.

Figure 6:
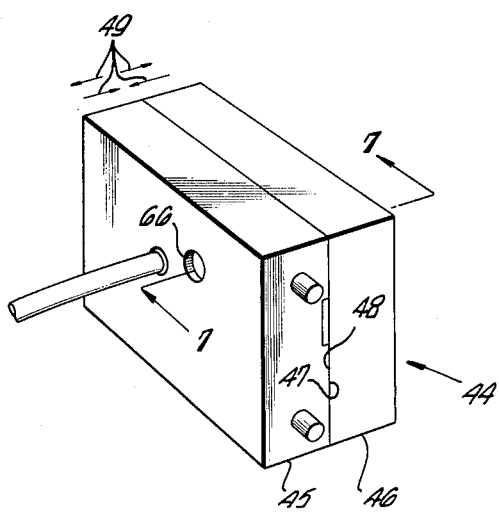
FIG. 6 is a perspective view of the mold used to form the pulley shown in FIGS. 1 through 5.
Figure 7:
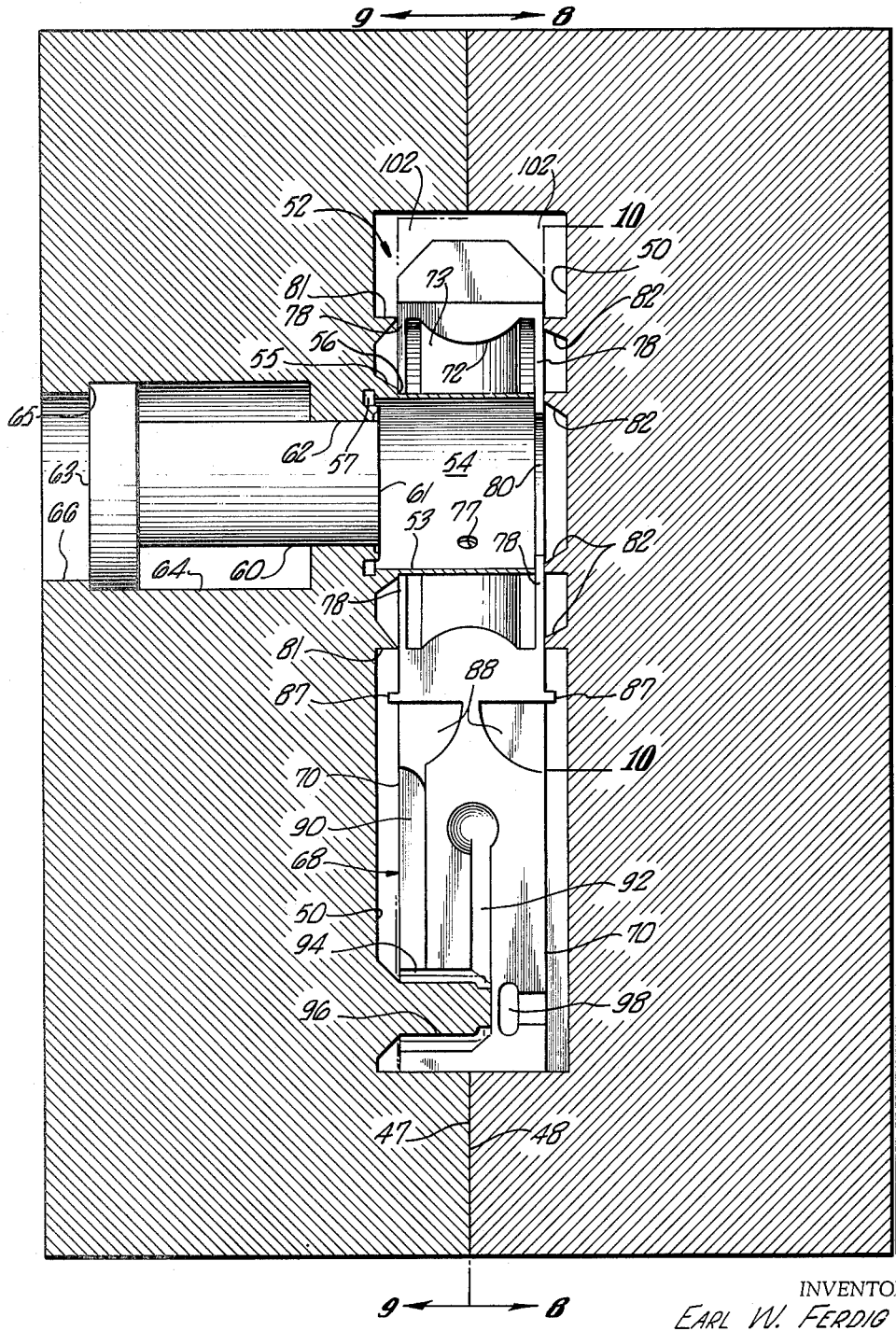
FIG. 7 is a view taken on line 7—7 of FIG. 6.

A mold 44 for casting the pulley assembly shown in FIGS. 1 through 5 is shown in FIGS. 6 through 12. The mold includes first and second rectangular blocks 45, 46, which include opposing surfaces 47, 48, adapted to be moved into and out of contact in the direction of the arrows 49 shown in FIG. 6. Each of the opposed surfaces in the blocks includes a rectangular recess 50 which cooperate to define a mold pocket 52 when the two blocks are fitted together as shown in FIG. 7. A hollow sleeve 53 is formed integrally at one end with the first block in the recess and extends into the mold pocket to form a shaft cavity 54. The exterior of the sleeve adjacent the first block includes a base 55 which extends outwardly away from the sleeve and toward the block. A small annular shoulder 56 is formed on the end of the base remote from the first block. The first block includes an annular undercut recess 57 which underlies the sleeve and extends slightly beyond the sleeve outside diameter to form a flange cavity for the flange 23 on the free end of the shaft shown in FIG. 5.

Figures 12, 13, 14:
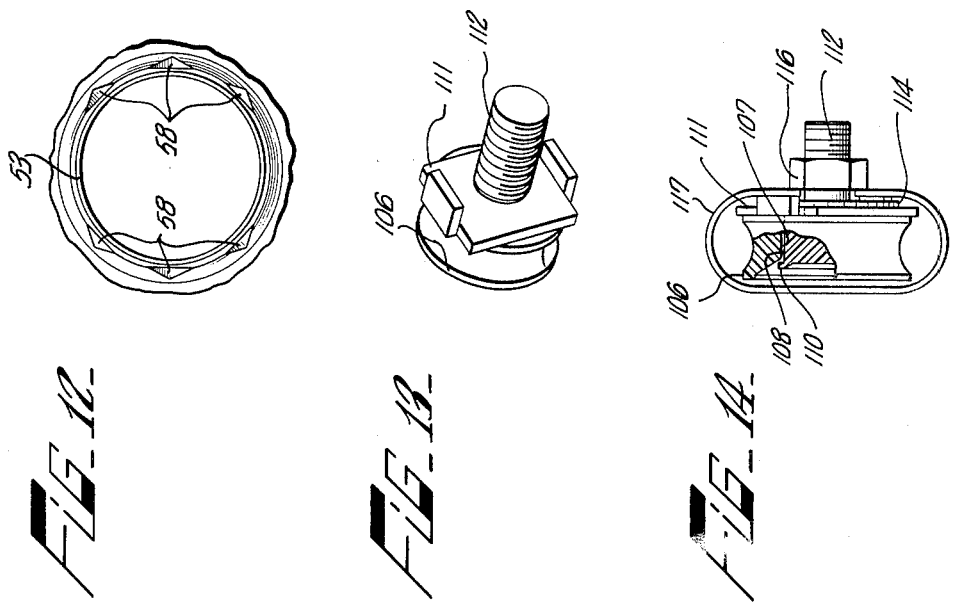
FIG. 12 is an enlarged fragmentary view taken in the general area of line 12—12 of FIG. 9.
FIG. 13 is a perspective view of an alternate form of the invention in which a clamp or bracket and threaded screw are formed integrally at one end of the shaft.
FIG. 14 is an elevation showing the assembly of FIG. 13 mounted in a traverse rod.
Figure 11:
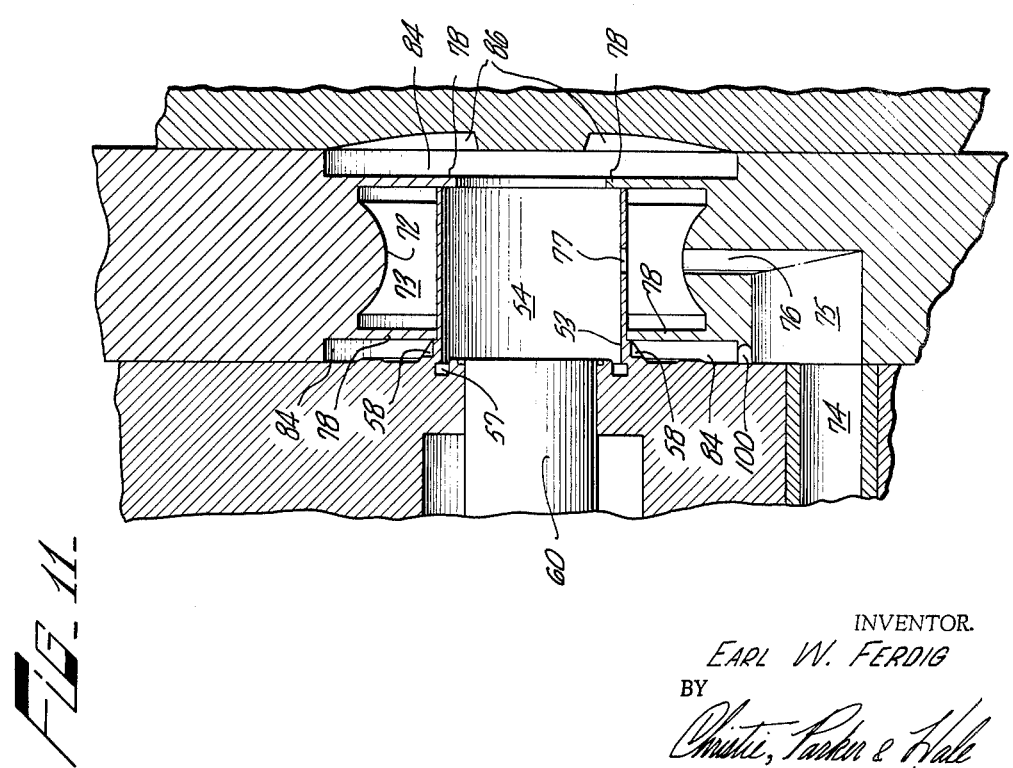
FIG. 11 is a view taken on line 11—11 of FIG. 8.

As shown best in FIGS. 11 and 12, the base 55 is notched away at six locations 58 around its periphery to form the inwardly extending radially spaced projections 22A (FIG. 1) around the periphery of the tapered opening 22 in the sidewall 17 of the pulley frame. These projections engage the flange 23 on the shaft and restrict the outward movement of the sidewall 17. However, by sufficient deflection, the opening 22 can be deformed over the flange 23 to permit the frame to be as wide as may be required to locate the pull cord around the roller and frame.

A longitudinally movable ejection pin 60 in the first block is collinear with the shaft cavity formed by the sleeve, and has an inner end 61 which makes a close sliding fit in a first bore 62 in the first block. A circular head 63 on the ejection pin makes a close sliding fit in an enlarged bore 64 in the first block and collinear with the bore 62. The pin is prevented from sliding out of the block by a shoulder 65 formed by the bore 64 and a slightly smaller bore 66 which extends from the outer end of bore 64 to the exterior of the first block.

A first mold insert 68 fits in one-half of the mold pocket, and a second mold insert 69 fits in the other half of the mold pocket. The two mold inserts each make a snug fit around the periphery of the pocket, and each has a ledge 70 extending toward the other and meeting on a line 71, which is symmetrical through the mold pocket. The two ledges include opposed semicircular recesses in their abutting edges which fit together to form an annular wall 72 around the sleeve to define an annular wheel cavity 73 around the sleeve. The annular wall is convex inwardly to form the concave annular groove in the wheel.

Plastic is injected into the mold through a filling opening 74 (FIG. 11) in the first block, which overlies a main passage 75 in the first mold insert where it fits against the first block. An interior channel 76 connects the passage 75 with the wheel cavity, and an opening 77 in the sleeve permits plastic to flow from the wheel cavity into the shaft cavity.

Each one of the mold inserts includes a pair of inwardly extending thin transverse walls 78 which overlie the wheel cavity and meet on centerline 71 (FIG. 8). Each transverse wall 78 nearer the first block is recessed in a semicircle to make a circular opening 79 which is a close fit around the sleeve exterior and rest on the shoulder 56. The two transverse walls nearer the second block are each recessed in opposed semicircles so they fit together to form a circular opening 80 of slightly smaller inside diameter than that of the sleeve. The thin transverse walls 78 nearer the first block are spaced from the block by supports 81 which are formed integrally with the first block and extend into the mold pocket to bear against the exterior of the transverse walls. The transverse walls adjacent the second block rest on supports 82 formed integrally with the second block. The supports prevent the deflection or warping of the thin walls when the plastic is injected under pressure, and cause the openings 40 in the sidewalls of the pulley frame. Thus, as shown best in FIGS. 7 and 8, the transverse walls and the ledges are spaced from their nearer respective blocks to define sidewall cavities 84 for the sidewalls of the pulley frame. The floor of the recess in the second block includes a pair of longitudinally extending cut-away portions 86 which form the reinforcing ribs 20 on the sidewalls 16 of the pulley frame.

Each of the transverse thin walls 78 includes ridges 87, which extend partially into their respective frame cavities to form the recesses 35 adjacent the supports 34 in the cast pulley. The opposing inner edges of the ledges on the mold inserts each have a pair of quarter-circle recesses 88 which fit together to form the spacer cavities for the spacers 34 in the molded pulley. The abutting edges of the ledges are also recessed adjacent their common surfaces nearer the first block to form a web cavity 90 for the rib 39 formed integrally on the inner face of the sidewall 15 of the pulley frame. Each of the abutting faces of the mold insert ledges includes one-half of a clip cavity 92 and a boss cavity 94 to form the boss and clip on the sidewall 15. A recess pin 96 formed integrally with the first block extends down to the bottom boss cavity to form the stepped opening for the button recess. One-half of a button cavity 98 is formed in each of the abutting faces of the mold insert shoulder to shape the button formed integrally on the sidewall 16 of the pulley frame.

A by-pass channel 100 is formed from the passage 75 into the frame sidewall cavity defined by the first block and the adjacent surface of the ledges on the mold insert.

The mold insert ledges at the right end (as viewed in FIG. 7) of the mold pocket are cut away to form a space 102 between their ends and the adjacent walls on the first and second blocks, and are also cut away to form a space 104 between their opposed faces in this area to form the closed end of the U-shaped frame and the reinforcing rib 17 on the inner face of the bottom of the frame.

To cast a pulley assembly with the mold shown in FIGS. 6-12, the blocks are held together as shown in FIG. 6, with the mold inserts mounted as shown in FIGS. 7 and 11. Hot fluid plastic, say, nylon, is injected into the filling opening and flows into the wheel cavity, the shaft cavity, and into the frame and button cavities formed adjacent the second block. Fluid plastic also flows into the by-pass channel 109 into the frame and boss cavities formed adjacent the first block. After the mold is full of plastic, injection is stopped and the mold is cooled until the plastic reaches a solid, but elastic, state. Then, and before the plastic takes its final set of maximum rigidity, the first and second blocks are pulled apart in the direction of the arrows shown in FIG. 6, at the same time the ejection pin is driven into the first block to force the shaft and the rest of the cast assembly, along with the mold inserts, out of the recess in the first block. The plastic is of sufficient flexibility that the flange on the end of the shaft in the sleeve is deformed enough to be forced from the sleeve. Thereafter, it immediately resumes its initially cast position, and takes a rigid set as shown in FIG. 5. The two mold inserts are then removed from the second block, and pulled apart, thereby freeing the pulley assembly, which is now ready for use because the small threads of plastic formed through the outer annular wall and sleeve are broken away as the pulley is removed from the molds.

Another form of the invention is shown in FIGS. 13 and 14. A roller 106 having an axial opening 107 through it is formed integrally around a shaft 108 which has an outwardly extending flange 110 at one end. The effective outside diameter of the flange is greater than the inside diameter of the opening in the roller so that the roller cannot slide longitudinally off the end of the flange. A C-shaped bracket 111 is cast integrally with the shaft on the side of the roller opposite from the flange, and a threaded shaft 112 integral with the bracket is adapted to receive a lock washer 114 and a nut 116 so the roller can be mounted in a traverse rod 117. The type of mold used to form the roller assembly, shown in FIGS. 13 and 14, is similar to that shown in FIGS. 6-12, except for minor variations which will be obvious to those skilled in the art as needed to produce the desired mounting fixture. Accordingly, a detailed description of the mold is not repeated, for brevity.

Thus, the roller assembly shown in FIGS. 13 and 14 is integrally formed of plastic in a single molding operation to have mounting fixtures rigidly attached so that the assembly is ready for use without any further assembling.

What is claimed is:

1. The combination comprising a plastic roller having an axial opening through it, a single plastic shaft disposed in the opening and extending through the roller, a mounting fixture formed integrally with one end of the shaft, the shaft and fixture being a single piece of plastic, the fixture extending transversely to the shaft axis for a distance sufficient to form an effective outer diameter greater than the effective diameter of the roller opening to prevent the roller from slipping longitudinally along the shaft and off the said end, and means for preventing the roller from slipping off the other end of the shaft.

2. The combination comprising a plastic roller having an axial opening through it, a single plastic shaft disposed in the opening and extending through the roller, one end of the shaft having a threaded portion, a bracket formed integrally with the shaft between the roller and the threaded portion, the shaft and bracket being a single piece of plastic, the bracket extending transversely to the shaft axis for a distance sufficient to form an effectve outer diameter greater than the effective diameter of the roller opening to prevent the roller from slipping longi- tudinally along the shaft and off the said end, and means for preventing the roller from slipping off the other end of the shaft.

3. The combination comprising a plastic roller having an axial opening through it, a single plastic shaft disposed in the opening and extending through the roller, and a plastic U-shaped fixture formed integrally with one end of the shaft and disposed around the roller, the shaft and fixture being a single piece of plastic, the fixture extending transversely to the shaft axis for a distance sufficient to form an effective outer diameter greater than the effective diameter of the roller opening to prevent the roller from slipping longitudinally along the shaft and off the said end.

4. The combination comprising a plastic roller having an axial opening through it, a single plastic shaft disposed in the opening and extending through the roller, and a plastic U-shaped frame having a pair of sidewalls disposed on opposite sides of the roller, the shaft and fixture being a single piece of plastic, one of the sidewalls being formed integrally with one end of the shaft, the other sidewall having an opening in it, and the other end of the shaft extending through the opening.

5. The combination comprising a plastic roller having an axial opening through it, a single plastic shaft disposed in the opening and extending through the roller, a plastic U-shaped frame having a pair of sidewalls disposed on opposite sides of the roller, the shaft and frame being a single piece of plastic, the sidewalls being formed integrally together at a closed end of the frame and being separate at an open end of the frame, one of the sidewalls being formed integrally with the shaft, and means formed integrally with the sidewalls at the open end of the frame for opening and closing the open end.

6. The combination comprising a plastic roller having an axial opening through it, a single plastic shaft disposed in the opening and extending through the roller, a plastic U-shaped frame having a pair of sidewalls disposed on opposite sides of the rollers, the shaft and frame being a single piece of plastic, the sidewalls being formed integrally together at a closed end of the frame and being separate at an open end of the frame, one of the sidewalls being formed integrally with the shaft, means forming a recess in one of the sidewalls opening toward the other sidewall, and an integrally formed button on the other sidewall extending toward the recess for opening and closing the open end of the frame.

7. The combination comprising a plastic roller having an axial opening through it, a single plastic shaft disposed in the opening and extending through the roller, a plastic U-shaped frame having a pair of sidewalls disposed on opposite sides of the roller, the shaft and frame being a single piece of plastic, the sidewalls being formed integrally together at a closed end of the frame and being separate at an open end of the frame, one of the sidewalls being formed integrally with the shaft, means forming a recess all the way through one of the sidewalls, the recess opening toward the other sidewall, and an integrally formed button on the other sidewall extending toward the recess for opening and closing the open end of the frame.

8. The combination comprising a plastic roller having an axial opening through it, a single plastic shaft disposed in the opening and extending through the roller, a plastic U-shaped frame having a pair of sidewalls disposed on opposite sides of the roller, the shaft and frame being a single piece of plastic, one of the sidewalls being formed integrally with the shaft, and a clip formed integrally on one of the sidewalls to open toward the roller and away from the open end of the U-shaped frame.

9. The combination comprising a plastic roller having an axial opening through it, a single plastic shaft disposed in the opening and extending through the roller, a plastic U-shaped frame having a pair of flexible sidewalls disposed on opposite sides of the roller, the shaft and frame being a single piece of plastic, one of the sidewalls being formed integrally with the shaft, a clip formed integrally on one of the sidewalls to open toward the roller and away from the open end of the U-shaped frame, means forming a recess in one of the sidewalls opening toward the other sidewall, an integrally formed button on the other sidewall extending toward the recess for opening and closing the open end of the frame, and spacer means formed integrally with at least one of the sidewalls and extending toward the other side wall between the roller and the open end of the frame to prevent the sidewalls from binding against the roller when the open end of the frame is closed.

10. The combination comprising a plastic roller having an axial opening through it, a single plastic shaft disposed in the opening and extending through the roller, a plastic U-shaped frame having a pair of flexible sidewalls disposed on opposite sides of the roller, the shaft and frame being a single piece of plastic, one of the sidewalls being formed integrally with the shaft, a clip formed integrally on one of the sidewalls to open toward the roller and away from the open end of the U-shaped frame, means forming a recess in one of the sidewalls opening toward the other sidewall, an integrally formed button on the other sidewall extending toward the recess for opening and closing the open end of the frame, and spacer means formed integrally with at least one of the sidewalls and extending toward the other sidewall between the roller and the open end of the frame to prevent the side walls from binding against the roller when the open end of the frame is closed, the sidewalls being of reduced thickness adjacent the spacer means to facilitate flexing of the sidewalls when the frame is closed.

References Cited by the Examiner
UNITED STATES PATENTS

| | | | |
|---|---|---|---|
| 977,593 | 12/1910 | Buck | 254—190 |
| 1,372,900 | 3/1921 | Olinger | 254—192 |
| 1,422,263 | 7/1922 | Haskel | 254—192 |
| 2,285,791 | 6/1942 | Auslander | 254—192 |
| 2,797,442 | 7/1957 | Wagner | 18—39 |
| 2,818,604 | 1/1958 | Miller et al. | 18—39 |
| 3,070,846 | 1/1963 | Schrier | 18—39 |

LOUIS J. DEMBO, *Primary Examiner.*

ANDRES H. NIELSEN, *Examiner.*

F. DUFFIELD, *Assistant Examiner.*